July 4, 1967 N. B. MEARS 3,329,541

METHOD OF FORMING FINE MESH SCREENS

Original Filed May 20, 1960

INVENTOR
NORMAN B. MEARS 3,329,541
Patented July 4, 1967

3,329,541

METHOD OF FORMING FINE MESH SCREENS

Norman B. Mears, Dakota County, Minn., assignor to Buckbee-Mears Company, St. Paul, Minn., a corporation of Minnesota Original application May 20, 1960, Ser. No. 30,644, now Patent No. 3,155,460. Divided and this application Mar. 11, 1964, Ser. No. 356,683
3 Claims. (Cl. 156—11)

This is a division of U.S. application Ser. No. 30,644, filed May 20, 1960, and now U.S. Patent 3,155,460.

This invention relates to improvements in fine mesh screens, evaporation masks, parts of miniature transistors and precision parts used in the fine sorting and sieving fields, and to an improved method of forming such articles by etching procedure.

It is an object of my invention to provide a fine mesh sheet metal screen which may be constructed from rolled sheet metal of any of the foil thicknesses presently available, including foils as thin as .0001 inch with a tolerance of plus or minus .00001 inch, up to .050, plus or minus .010 inch, and having any desired number of openings per line including those within the range from 100 to 1000 openings per lineal inch, of precisely controlled sizes and sharply defined polygonal shapes.

A further object is to provide fine mesh metal parts of the class described which are adapted to be constructed from metals having good corrosion resistance, high tensile strength, electrical characteristics in and out of wholly or partially evaporated envelopes, closely controlled hardness and high melting points, for example, sheets of stainless steel, molybdenum, tungsten, or alloys of copper, silver and ion.

A particular object is to provide precision articles of the class described having openings defined by elongated spaced ridges and grooves between ridges, extending over both sides of the screen, with the ridges and grooves at one side crossing those at the other side so that the dimensions of the openings are determined by the widths of the grooves.

Another object is to provide a novel low cost method of forming such screens and other precision articles of the classes described utilizing conventional etching procedure and resist patterns of parallel, non-intersecting lines.

A further object is to provide an improved method for forming such precision articles by the use of automatic sensitizing, printing and development equipment whereby better screens may be produced to sell at prices which are competitive with those of woven wire screens.

Other objects will appear and be particularly pointed out in the following specification and claims.

Heretofore fine mesh screens of foil thickness, having large numbers of openings per unit of area having produced by electroforming, by etching and by combinations of electroforming and etching. These known procedures have certain features in common which have greatly increased the cost of fine mesh screens and have limited their fields to use. Some of the causes of the high cost and deficiencies of the prior screens and methods of making them will be evident from the following explanation. The photo-printed patterns of etching resist lines and lines to be electroformed have consisted of lines which cross on the same side of the blank sheet or dots. For etching through the thinner foil, the crossed line patterns or dots have been applied to one side and for the thicker sheets to both sides, with the patterns in registry on the respective sides.

After photo-printing, such patterns must be developed in order to expose precisely defined minute surface areas of the metal sheet, or matrix in the case of electroforming. Thorough development and removal of the remaining soluble coating from the minute areas of the underlying metal is extremely difficult where the pattern consists of dots or where the lines of the pattern cross. As a consequence the etched holes or electroformed lines or dots are often so defective that the finished screen must be rejected. Defects of this kind, caused by "scum" remaining on the developed aperture surfaces, are extremely difficult to detect until the screen has been formed. Consequently there are many rejects due to "scumming." Other difficulties, limitations on the shape of the screen openings, and rejections of etched screens, have been caused by failure of the etching solution to reach and fully etch out all of the minute pocket areas defined by the dot or cross-line etching resist patterns. Moreover, the previously etched fine mesh openings are characteristically round for the reason that it is practically impossible to form sharp corners in minute screen openings by etching through the finer crossed line or dot patterns of resist.

Electroformed screens as heretofore made have not been entirely satisfactory and have not given maximum results in some fields of use for the reason that the filaments defining the screen openings have had relatively low tensile strength, low melting point and insufficient hardness to resist harmful deformations resulting from normal handling during fabrication or when in use. The basic reason for these deficiencies is found in the physical properties of the metals (nickel, silver, gold and copper) which have been best suited for electroforming such screens. Other imperfections in such screens are caused by entrapped gases and traces of other substances carried by the plating baths.

By the present invention I obviate the foregoing difficulties and greatly reduce the cost of fine screens of the class described.

According to the present invention a predetermined pattern of spaced, non-intersecting lines of the required widths and numbers per inch is reproduced on opposite sides of the metal sheet, the pattern being defined by etching resist material and having the resist lines and bare line areas on one side crossing those on the other side of the sheet. The bare line areas at both sides of the sheet are then etched to a depth less than the thickness of the sheet, and the etching is continued until the screen openings are formed at the crossing points of the bare line areas. In this manner the major difficulties attendant upon photo-printing and etching cross line patterns are obviated. This will be evident when it is considered that both the fluid used in developing the resist pattern and that used in etching the depressions of a spaced line pattern readily flow along the lines defined by the resist coating and perform the desired functions of the fluids more rapidly and thoroughly than is possible with similar treatment of fine cross line patterns or dot patterns.

Where the lines defining the screen filaments are straight, as is usually the case, there is no problem involved in properly locating the pattern on one side of the sheet in relation to that on the other side. I thus eliminate the difficulties heretofore encountered where precise registry of the pattern on one side of the sheet with that on the other side is required. My line patterns can be printed as a continuous operation by the use of relatively simple and automatic mechanism since there is no need for registering the patterns on master printing plates at the respective sides of the metal sheet.

Another advantage of my method over those heretofore in use resides in the elimination of the principal difficulties attendant upon the preparation of the master printing plate from which the pattern of lines is to be reproduced photographically. A fine line pattern of parallel lines which do not cross is much easier to reproduce, with close tolerances, on a master plate than a pattern of crossed lines.

The accompanying drawing illustrates, by way of example and not for the purpose of limitation, the structural features of my improved fine mesh screens and typical resist patterns used in my improved method.

Figure 2:
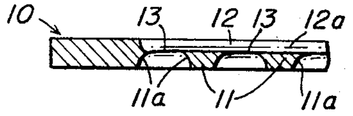
FIG. 2 is a fragmentary sectional view taken on the line 2—2 of FIG. 1.
Figure 3:
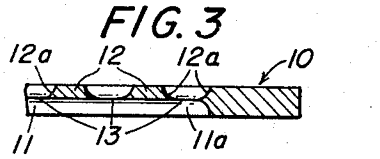
FIG. 3 is a fragmentary sectional view taken on the line 3—3 of FIG. 1.
Figure 4:
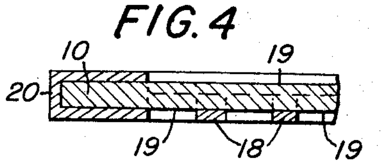
FIGS. 4 and 5 are sectional views similar to those shown in FIGS. 2 and 3 respectively but showing the metal sheet before etching and with a developed etching resist pattern suited to the screen shown in FIGS. 1–3.

In the drawing a metal sheet of foil thickness, e.g., .02 inch to .005 inch thick, is indicated generally by the numeral 10 and screen openings of rectangular shape are indicated at 13. These openings are defined by a multiplicity of parallel ridges 12 extending across one side of the sheet 10 and a multiplicity of similar ridges 11 extending across the ridges 12 at the other side of the sheet, the several ridges at both faces of the sheet being separated by grooves, the widths of which determine the size of the several openings 13. As best shown in FIGS. 2 and 3, the several grooves extend to a depth which is less than the thickness of the sheet 10. Maximum strength is obtained by extending the grooves in each side of the sheet to a depth approximately equal to one-half the thickness of the sheet 10. As shown, the several ridges 12 are straight and parallel one to the others and the ridges 11 are also straight and parallel one to the others, all ridges being of substantially uniform and equal width to provide square openings 13 having sharp rectangular corners. Since the grooves are formed by etching, the surfaces of the ridges 11 and 12 have concavely arcuate sides indicated at 11*a* and 12*a* respectively.

It will be evident that by suitable selection of the widths of the ridges 12 and 13 relative to the widths of the grooves between them, any of a wide range of ratios between the open areas of the screen to the land areas or width of the filaments between openings may be obtained. Imperforate margin portions 14 of suitable width may be provided to facilitate the handling of the screen.

Figure 6:
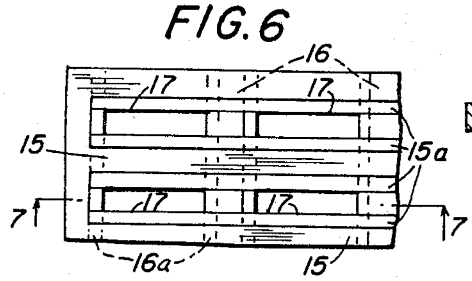
FIG. 6 is a plan view showing a modification of the screen shown in FIGS. 1–3.
Figure 7:
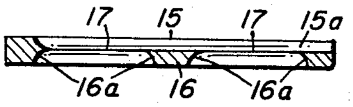
FIG. 7 is a cross sectional view taken on the line 7—7 of FIG. 6.

In the modification of the invention shown in FIGS. 6 and 7, elongated and relatively narrow slits 17 may be formed merely by printing and etching a larger number of groove lines between ridges 15 on one side of the metal sheet than between ridges 16 at the other side of the sheet. The concave sides of the ridges 15 are indicated at 15*a* and similar sides of the ridges 16 are indicated at 16*a*.

Figure 1:
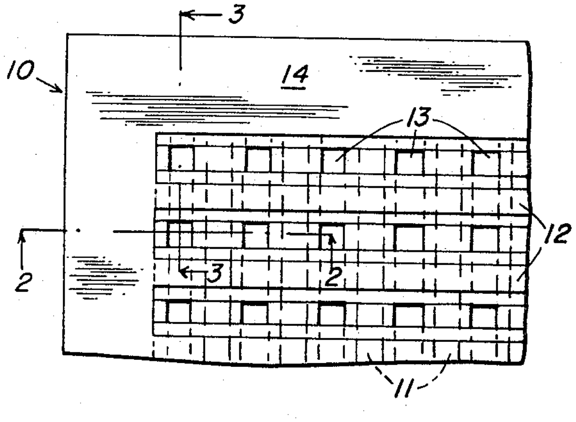
FIGURE 1 is a fragmentary plan view, on a greatly enlarged scale, showing a corner portion of one of my improved screens.
Figure 5:
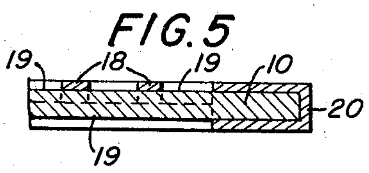

To form the screen exemplified by the structure shown in FIGS. 1–3, my preferred procedure is as follows: The blank sheet 10 is coated on both sides with a photo-resist layer; the pattern of the ridges 12 is photo-printed on one side of the resist layer, and the pattern of the ridges 11 is photo-printed on the other side. As the next step, the resist pattern is developed on both sides to thereby uncover the areas at both sides corresponding to those of the groove between ridges. As shown in FIG. 5, the portions of the etching resist layer which remain after being developed are indicated at 18, and the bare areas of the metal sheet to be etched are indicated at 19. The edge surfaces of the sheet 10 are also protected from the etching agent by a coating 20 of suitable resist material.

Thereafter, by conventional etching treatment, the bare areas of the sheet are etched from both sides to a predetermined depth, usually equal to one-half the thickness of the metal sheet. It will be evident that the screen openings 13 are complete when the etched lines in one side of the sheet meet those in the other side. The time required for this etching treatment is not critical for the reason that continuation of the etching for a brief period after the complete penetration of the sheet merely reduces the thickness of the filaments between openings. Thus for filaments of maximum strength, the etching should be stopped approximately when the etched depressions have been extended to a depth approximately equal to one-half the thickness of the sheets.

The procedure for forming the modified screen shown in FIGS. 6 and 7 is similar to that described with reference to FIGS. 1–5, except that the etching resist of patterns on one side of the sheet differs from that on the other in that ridges 15 are formed by an etching resist pattern which has a larger number of lines per inch than the pattern defining the ridges 16 on the other side of the sheet.

For some types of screens it may be desirable to locate the plane where the grooves at one side meet those at the other side closer to one side than the other. Such a screen may be formed merely by etching the grooves at one side to a greater depth than those at the other side.

For most uses, it is desirable to provide openings of rectangular shape, as defined by ridges at one side of the sheet extending at right angles to those of the other side. The pattern defining the ridges may be modified to produce openings of diamond shape or other non-rectangular shape. A screen of this character will have ridges at one side crossing those at the other side at an oblique angle.

The precision articles constituting the subject-matter of this invention are particularly adapted to be produced by the use of automatic equipment. For example, the blank sheet or foil may be coated on both sides with light sensitive material by the use of machines and methods such as those described in my Patents Nos. 2,710,591 and 2,710,814, both dated June 14, 1955, or by the use of apparatus such as that described in my Patent No. 2,786,443, dated Mar. 26, 1957, or Patent No. 2,791,514. The patterns may be photo-printed on the sensitized surfaces of the metal sheet or web by apparatus, suitably modified, such as those shown in my Patents Nos. 2,720,146, dated Oct. 11, 1955, and No. 2,814,975, dated Dec. 3, 1957. Such automatic, continuous or intermittent photo-printing of the patterns is greatly simplified by the fact that the patterns on opposite sides need not be in registry.

As the next step in the procedure, the photo-printed patterns may be developed by the use of a machine such as that described in my Patent No. 2,751,829, dated June 26, 1956. Finally, the continuous web or sheet of metal may be etched simultaneously from both sides by the use of methods and apparatus such as those described in my Patents Nos. 2,762,149, dated Sept. 11, 1956, and No. 2,822,635, dated Feb. 11, 1958. It is thus apparent that the production of precise fine mesh precision articles may be carried out at a greatly reduced cost as compared with the cost of previously known fine mesh articles.

Other advantageous features of my invention, heretofore mentioned, may be summarized as follows:

(1) Substantial elimination of the defects resulting from scumming and failure of etching solutions to reach and etch out some of the minute apertures.

(2) Apertures of uniform size and shape having sharp corners, rather than filleted or rounded corners.

(3) Provision of fine mesh articles made from strong heat resistant metals or alloys without sacrificing precision and low tolerances.

(4) When used in vacuum tubes and in other electrical devices, my fine mesh screen or grid elements have distinct advantages over fine woven wire elements in that greatly improved electric current and heat conductivity between the screen and its supporting elements or lead wire connectors is provided due to the continuous line surface contact that may be attained between such elements and my screen, as compared to the spaced point contacts with the crossing wires of woven screens. Terminal wire connectors or supports may be formed as integral parts of my screen, thereby eliminating the need for making fused or soldered joints at the junctions of connectors or supporting elements.

I claim:

1. A method of forming a fine mesh screen from a metal sheet of composition susceptible to controlled etching comprising the steps of, reproducing on opposite sides of a sheet of foil thickness in the range of .0001 to .060 inch a predetermined pattern of fine lines defined by etching resist material, the said lines on each side being spaced one from another by bare line areas to define a mesh in the range of 100 to 1000 openings per lineal inch with the resist lines and bare line areas on one side arranged to cross those on the other side of the sheet, partially etching away the bare areas from both sides of said sheet to a depth less than the thickness of said sheet and continuing the etching from at least one side until forming openings only where the respective bare line areas cross one another.

2. A method of forming a fine mesh screen in accordance with claim 1 wherein said respective patterns of etching resist material on each side of the sheet are straight parallel lines and are photographically reproduced on the sheet by contact printing and then are developed out on both sides to expose the sheet in said respective bare line areas for the etching treatment.

3. A method of forming a fine mesh screen in accordance with claim 2 in which said pattern of lines is arranged such that the lines on one side cross those on the other side at right angles so that substantially rectangular openings are formed through the sheet by partially etching the bare line areas on both sides.

References Cited

UNITED STATES PATENTS

| | | | |
|---|---|---|---|
| 378,423 | 2/1888 | Baynes | 156—11 |
| 2,536,383 | 1/1951 | Mears et al. | 156—11 X |
| 2,596,617 | 5/1952 | Teal | 156—11 |

FOREIGN PATENTS

| | | |
|---|---|---|
| 107,189 | 4/1939 | Australia. |

JACOB STEINBERG, *Primary Examiner*.